US012752721B2

(12) United States Patent
Huang et al.

(10) Patent No.: US 12,752,721 B2
(45) Date of Patent: Oct. 6, 2026

(54) OPERATING METHOD FOR VEHICLE

(71) Applicant: CARUX TECHNOLOGY PTE. LTD., Singapore (SG)

(72) Inventors: Yu-Chia Huang, Miao-Li County (TW); Tsung-Han Tsai, Miao-Li County (TW); Kuan-Feng Lee, Miao-Li County (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 311 days.

(21) Appl. No.: 18/409,325

(22) Filed: Jan. 10, 2024

(65) Prior Publication Data

US 2024/0270185 A1 Aug. 15, 2024

Related U.S. Application Data

(60) Provisional application No. 63/484,391, filed on Feb. 10, 2023.

(30) Foreign Application Priority Data

Sep. 15, 2023 (CN) ........................ 202311192216.8

(51) Int. Cl.
*B60R 16/023* (2006.01)
*B60K 35/28* (2024.01)
*B60K 35/60* (2024.01)

(52) U.S. Cl.
CPC .......... *B60R 16/0231* (2013.01); *B60K 35/28* (2024.01); *B60K 35/60* (2024.01); *B60K 2360/166* (2024.01)

(58) Field of Classification Search
CPC .... B60R 16/0231; B60K 35/28; B60K 35/60; B60K 2360/166; G07C 5/008; G07C 5/0841; H04L 63/107; H04L 67/12
See application file for complete search history.

(56) References Cited

U.S. PATENT DOCUMENTS 11,438,938 B1 * 9/2022 Kennedy ............... H04W 12/08
11,528,759 B1 * 12/2022 Kennedy ................. H04L 67/10
11,769,407 B1 * 9/2023 Kennedy ............... H04W 4/025 709/203
2019/0297088 A1 * 9/2019 Lee ....................... H04L 63/126
2020/0202645 A1 * 6/2020 Gintz ................... G07C 5/0825
2020/0344824 A1 * 10/2020 Kennedy ................. H04W 4/40
2022/0086924 A1 * 3/2022 Fields ..................... H04W 4/46

FOREIGN PATENT DOCUMENTS

CN 115991169 A 4/2023

* cited by examiner

*Primary Examiner* — Richard M Camby
(74) *Attorney, Agent, or Firm* — JCIPRNET

(57) ABSTRACT

An operating method for a vehicle is provided to operate the vehicle via at least one command output source. The operating method includes steps of: providing a request signal to the vehicle for transmitting a data signal to at least one component of the vehicle; providing an approval signal to the vehicle; transmitting the data signal from the at least one command output source to the at least one component of the vehicle according to the approval signal; and operating the at least one component of the vehicle according to the data signal.

19 Claims, 11 Drawing Sheets

OPERATING METHOD FOR VEHICLE

CROSS-REFERENCE TO RELATED APPLICATIONS

This application claims the benefit of filing date of U.S. Provisional Application Ser. No. 63/484,391 filed on Feb. 10, 2023 under 35 USC § 119(e)(1), and also claims the benefit of the Chinese Patent Application Serial Number 202311192216.8, filed on Sep. 15, 2023, the subject matters of which are incorporated herein by reference.

BACKGROUND

Field of the Disclosure

The present disclosure relates to an operating method for a vehicle and, more particularly, to a method for controlling or operating components on the vehicle.

Description of Related Art

With the development of science and technology, command output sources (such as drivers or passengers in vehicles, or operating instruments or mobile devices used by drivers or passengers) may be used to control various equipment on vehicles (such as cars), for example, it may control the vehicle entertainment system. However, when a vehicle is controlled by multiple command output sources at the same time, it is likely to increase driving safety risks and cause accidents.

Therefore, it is desired to provide an improved operating method for a vehicle to mitigate and/or obviate the aforementioned problems.

SUMMARY

The present disclosure provides an operating method for a vehicle, which operates the vehicle through at least one command output source. The operating method includes the steps of: providing a request signal to the vehicle to request transmission of data to at least one component on the vehicle; providing an approval signal to the vehicle; the at least one command output source transmitting the data to the at least one component according to the approval signal; and enabling the at least one component to operate according to the data.

Other novel features of the disclosure will become more apparent from the following detailed description when taken in conjunction with the accompanying drawings.

DETAILED DESCRIPTION OF EMBODIMENT

Figure 1:
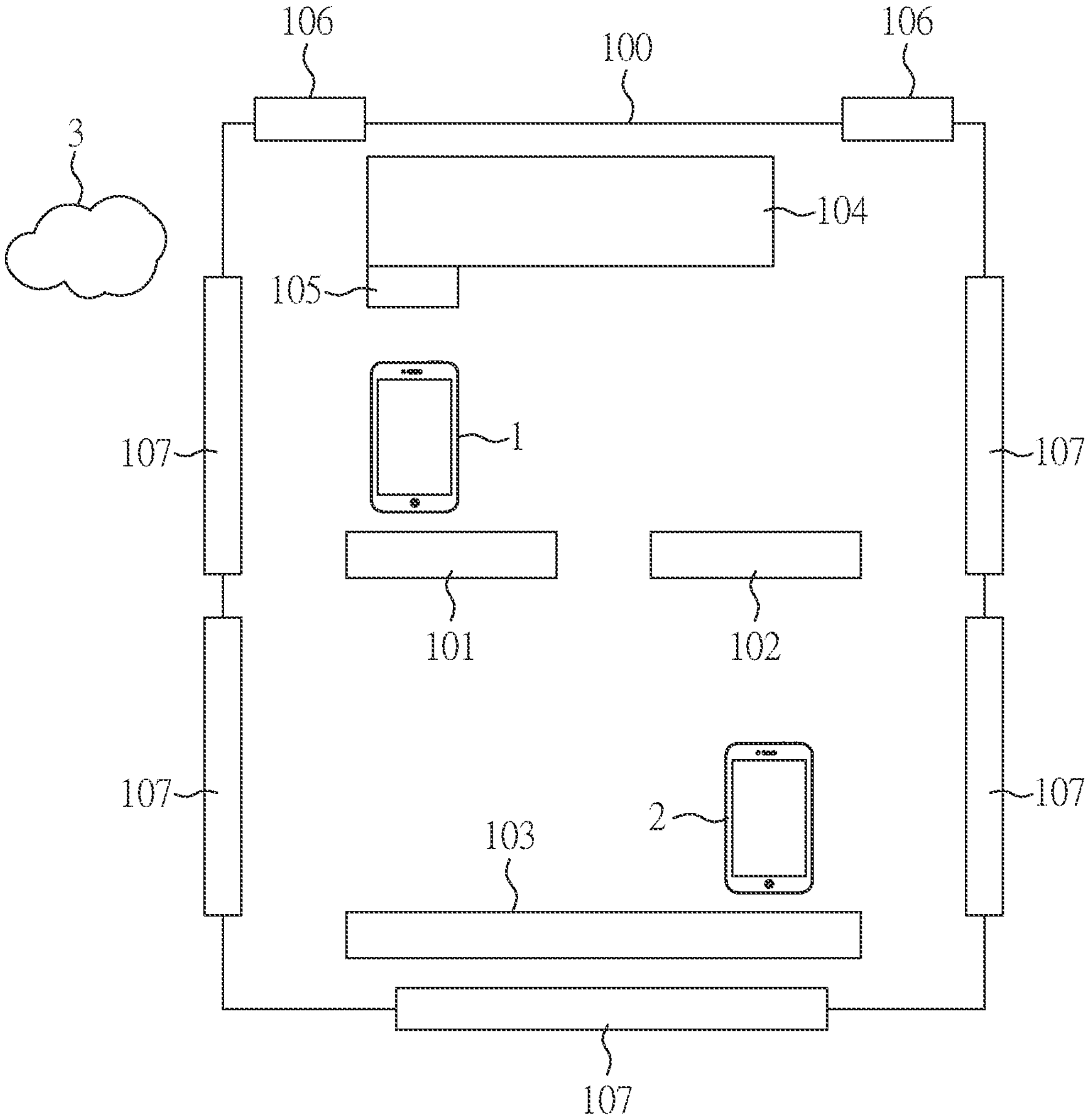
FIG. 1 is a schematic diagram illustrating an operating scenario of an operating method for a vehicle according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to".

The terms, such as "about", "substantially", or "approximately" are generally interpreted as within 10% of a given value or range, or as within 5%, 3%, 2%, 1% or 0.5% of a given value or range.

In the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. Thus, what is referred to as a "first component" in the specification may be referred to as a "second component" in the claims.

In the present disclosure, the terms "the given range is from the first numerical value to the second numerical value" and "the given range falls within the range from the first numerical value to the second numerical value" mean that the given range includes the first numerical value, the second value, and other values therebetween.

In addition, the operating method disclosed in the present disclosure may be used to operate electronic devices on a vehicle, wherein the electronic devices may include display devices, vehicle devices, imaging devices, assembly devices, backlight devices, sensing devices, antenna devices, tiled devices, touch electronic devices, curved electronic devices or free shape electronic devices, but not limited thereto. The display device includes, for example, liquid crystal, light emitting diode, fluorescence, phosphor, other suitable display media, or a combination thereof, but not limited thereto. The display device may be a non-self-luminous display device or a self-luminous display device. The antenna device may be a liquid crystal type antenna device or a non-liquid crystal type antenna device, and the sensing device may be a sensing device that senses capacitance, light, heat energy or ultrasonic waves, but not limited thereto. The tiled device may include, for example, a display tiled device or an antenna tiled device, but not limited thereto. It should be noted that the electronic device may be any combination of the above, but not limited thereto. In addition, the electronic device may be a bendable or flexible electronic device. It should be noted that the electronic device may be any combination of the above, but not limited thereto. In addition, the shape of the electronic device may be a rectangular shape, a circular shape, a polygonal shape, a shape with curved edges, or other suitable shapes. The electronic device may have peripheral systems such as drive system, operating system, light source system, shelf system, etc. to support the display device, antenna device or tiled device.

It is noted that the following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

In addition, the term "adjacent" in the specification and claims is used to describe mutual proximity, and does not necessarily mean mutual contact.

In addition, descriptions such as "when" or "while" in the present disclosure represent aspects such as "now, before or after", and are not limited to situations that occur at the same time. In the present disclosure, similar descriptions such as "disposed on" refer to the corresponding positional relationship between the two components, and do not limit whether there is contact between the two components, unless otherwise specified. Furthermore, when the present disclosure provides multiple functions, if the word "or" is used between the functions, it means that the functions may exist independently, but it does not exclude that multiple functions may exist simultaneously.

FIG. 1 is a schematic diagram illustrating an operating scenario of an operating method for a vehicle according to an embodiment of the present disclosure. It is noted that the example in FIG. 1 simplifies the components that the vehicle 100 (e.g., a car) may have in order to make the explanation clear. As a matter of fact, the components of the vehicle 100 are not limited thereto. In addition, in one embodiment, the type of the vehicle 100 of the present disclosure may include cars (such as sedans, buses, self-driving cars, trucks, etc.), high-speed rails, trains, subways, airplanes or ships, while it is not limited thereto. For convenience of explanation, a car will be used as an example below.

As shown in FIG. 1, the operating method for a vehicle of the present disclosure may be executed through the vehicle 100 and at least one command output source. The type of the command output source may include, for example, but not limited to, a person (such as a user), operating buttons of the vehicle 100 itself, a mobile device of the user, or a cloud device. In one embodiment, when the command output source is a user, the user may use gestures, voice, fingerprints, appearance, movements or other suitable methods to output operating commands, and the vehicle 100 may receive, for example, the user's gestures, voice, fingerprints, appearance or movements, and convert the user's gestures, voice, fingerprints, appearance, movements, etc. into operating commands, whereby the user may operate the components on the vehicle 100, while it is not limited thereto. In one embodiment, when the command output source is the operating button of the vehicle 100 itself, the mobile device of the user or the cloud device, the command output source may send a control signal to the vehicle 100 to operate the components on the vehicle 100, while it is not limited thereto. When executing the operating method, the command output source (such as the user, the operating buttons of the vehicle 100, the mobile device 1, etc.) may be disposed within or outside the vehicle 100, while the cloud device may be disposed outside the vehicle 100. For convenience of explanation, an implementation aspect of the present disclosure will be described below with a first command output source 1, a second command output source 2 and/or a third command output source 3, wherein the first command output source 1 and the second command output source 2 may be regarded as the command output sources disposed within the vehicle 100, and the third command output source 3 may be regarded as a command output source disposed outside the vehicle 100, but it is not limited thereto.

In addition, in one embodiment, the vehicle 100 is provided with a driver seat 101 and a passenger seat 102, and may be further provided with a rear seat 103, but it is not limited thereto. The vehicle 100 also includes a center console 104. The center console 104 may be provided with a steering wheel 105, and the driver seat 101 may be defined as the seat closest to the steering wheel 105. When a user (such as a driver or a passenger) approaches or enters the vehicle 100, the driver sitting (or about to sit) in the driver seat 101 and the passenger sitting (or about to sit) in the passenger seat 102 or the rear seat 103 may each carry a mobile device, wherein the driver or the mobile device of the driver is usually close to the driver seat 101 or the steering wheel 105, and the passenger or the mobile device of the passenger is usually farther away from the driver seat 101 or the steering wheel 105. In addition, the vehicle 100 usually has more operating buttons near the driver seat 101 or the steering wheel 105 for use by the driver, while the vehicle 100 has fewer operating buttons near the passenger seat. In addition, the vehicle 100 may be further provided with components such as vehicle lights 106 and vehicle windows 107, but it is not limited thereto. Since the vehicle 100 has many types of components that cannot be fully presented in the figure, FIG. 1 only shows vehicle lights 106, vehicle windows 107, etc. as examples. In addition, the number of mobile devices or cloud devices mentioned above is only an example but not a limitation.

In one embodiment, the type of mobile device may include a watch, a mobile phone, a tablet computer, a notebook computer, or a portable electronic device with communication or mobile Internet function, while it is not limited thereto. In one embodiment, the cloud device 3 may include, for example, a cloud server, but it is not limited thereto.

The operating method for a vehicle of the present disclosure may be provided to operate the components on the vehicle 100 through the first command output source 1 (such as but not limited to the user, operating button or mobile device), the second command output source 2 (such as but not limited to the user, operating button or mobile device) or the third command output source 3 (for example, but not limited to, the cloud device), or to cause the components on the vehicle 100 to operate according to the data of the first command output source 1, the second command output source 2 or the third command output source 3, wherein the components on the vehicle 100 may be, for example, components that can be controlled by electrical signals, but not limited thereto. In one embodiment, in addition to the aforementioned types, the components on the vehicle 100 may also include air conditioners, audio devices, camera devices, various auxiliary systems of the vehicle (such as advanced driver assistance system (ADAS) and the like, but not limited thereto), vehicle display devices, navigation devices, driving recording devices, etc., but not limited thereto.

Figure 2A:
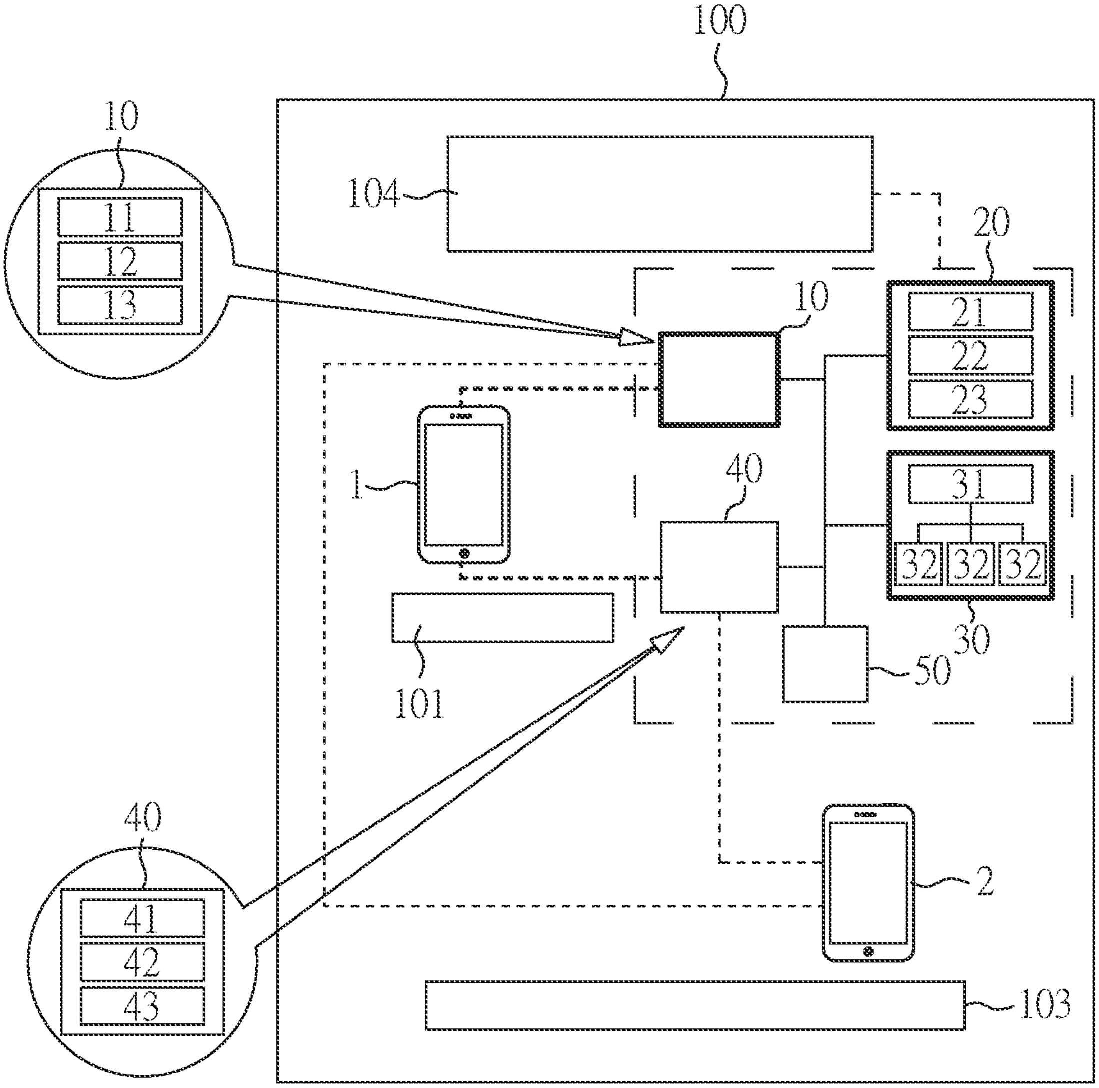
FIG. 2A is a schematic diagram of the first command output source and the vehicle according to an embodiment of the present disclosure.

In addition, in one embodiment, the vehicle 100, the first command output source 1 (when the command output source is a mobile device), the second command output source 2 (when the command output source is a mobile device) or the third command output source 3 (cloud device, as shown in FIG. 2A) may be used to implement the operating method of the present disclosure by executing at least one computer program product, wherein the at least one computer program product may have one or more instructions for driving the processor or controller of the vehicle 100, the mobile device or the cloud device to execute the steps of the operating method of the vehicle, but it is not limited thereto. In one embodiment, at least one computer program product may be stored in a non-transitory computer-readable medium, wherein the non-transitory computer-readable medium may include, for example, a storage device of the vehicle 100, the mobile device, or the cloud device (for example, but not limited to, hard disk or memory), while it is not limited thereto.

Furthermore, one of the features of the operating method for a vehicle of the present disclosure includes: the operating commands of the first command output source 1, the second command output source 2 or the third command output source 3 to be performed on the vehicle 100 may only be executed or operated after the driver agrees and provides an approval signal by using gestures, voice, fingerprints, appearance, movements, mobile devices, or operating buttons around the driver seat 101 or the steering wheel 105, such as the buttons on the steering wheel 105 (please refer to the examples of FIG. 5A and FIG. 5B), so as to ensure that the settings of the components on the vehicle 100 related to driving safety will not be easily changed, thus reducing the probability of being interfered when driving the vehicle 100, but it is not limited thereto.

Alternatively, one of the features of the operating method for a vehicle of the present disclosure includes: the first command output source 1 and the second command output source 2 have different operating permissions for the components on the vehicle 100 (refer to the example of FIG. 3), which may ensure that operations that affect driving safety may only be performed by the driver, which can reduce the probability of being interfered when driving the vehicle 100, but it is not limited thereto.

Figure 2B:
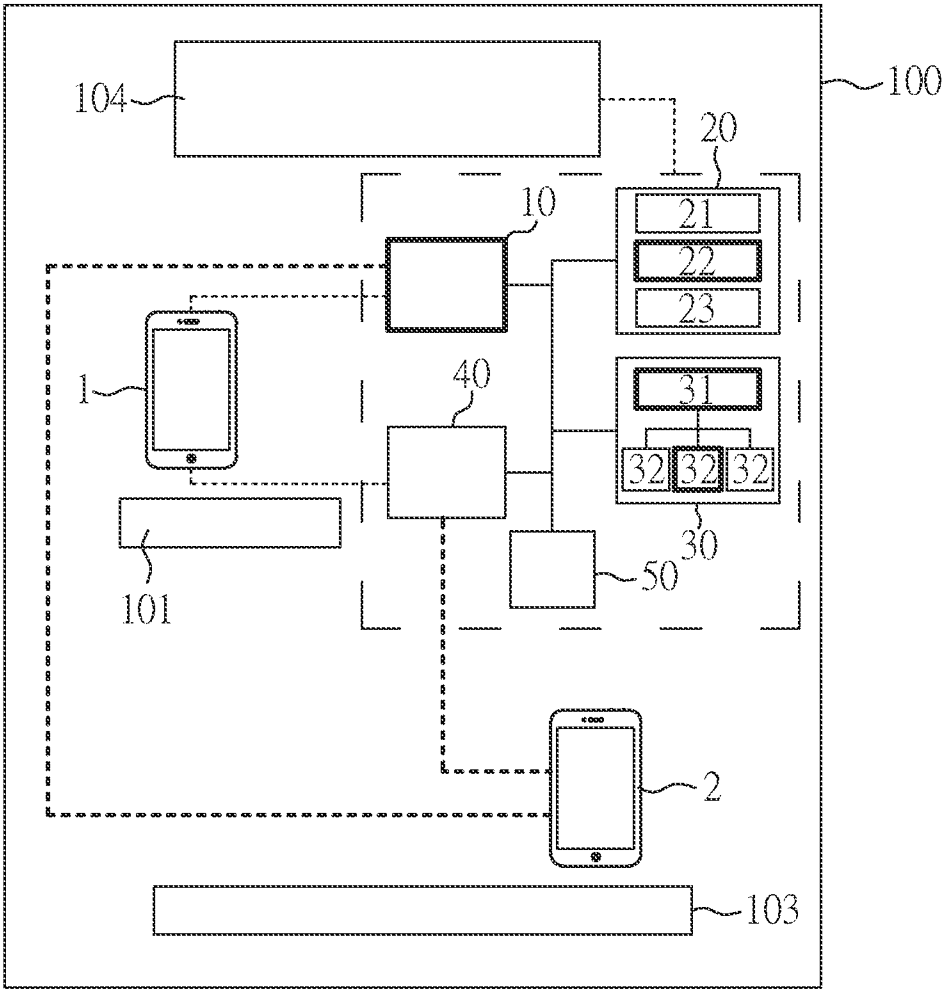
FIG. 2B is a schematic diagram of the second command output source and the vehicle according to an embodiment of the present disclosure.

Next, more details will be described with FIG. 2A and FIG. 2B, and please also refer to FIG. 1 for assistance. FIG. 2A is a schematic diagram of the first command output source 1 and the vehicle 100 according to an embodiment of the present disclosure. FIG. 2B is a schematic diagram of the second command output source 2 and the vehicle 100 according to an embodiment of the present invention. For convenience of explanation, in FIG. 2A and FIG. 2B, the first command output source 1 and the second command output source 2 are mobile devices, and the vehicle 100 is a car.

As shown in FIG. 2A, the vehicle 100 may include a vehicle system 10, an in-vehicle display system 20, an electronic control system 30, a detection and authentication system 40 and a controller area network (CAN) 50.

In one embodiment, the vehicle system 10 may include a navigation system 11, a vehicle entertainment system 12 and an electromechanical control system 13, but it is not limited thereto. In one embodiment, the vehicle system 10 may drive the in-vehicle display system 20 and/or the electronic control system 30 to operate, but it is not limited thereto. In one embodiment, the user may operate the vehicle system 10 or adjust parameter settings of the vehicle system 10 by using gestures, voice, fingerprints, appearance, movements, mobile devices or operating buttons of the vehicle 100 itself. Therefore, the vehicle system 10 may also be regarded as part of the components on the vehicle 100, but it is not limited thereto.

In one embodiment, the in-vehicle display system 20 may include, for example, various types of vehicle displays, wherein the type of vehicle displays includes a dashboard display 21, a window display 22, a head-up display 23, a cluster display (not shown) or a center information device (CID, not shown), or a combination thereof, while it is not limited thereto. In one embodiment, the cluster display may be part of the dashboard display 21, but it is not limited thereto. In one embodiment, the implementation of the vehicle window display 22 may include using vehicle windows such as the front windows (windshields), side windows, back windows, and/or sunroofs as displays through, for example, projection onto the vehicle windows or display function provided by the vehicle window itself, but it is not limited thereto. In addition, since there are many types of vehicle displays, for convenience of explanation, in the following embodiments, the in-vehicle display system 20 including the dashboard display 21, the window display 22 and the head-up display 23 is taken as an example, but it is not limited thereto. In one embodiment, the user may use the first command output source 1 (such as a first mobile device) or the second command output source 2 (such as a second mobile device) to operate the in-vehicle display system 20 or adjust parameter settings of the in-vehicle display system 20, and thus the in-vehicle display system 20 may be regarded as part of the components on the vehicle 100.

In one embodiment, the electronic control system 30 may include at least one electrical control unit (ECU) 31 and at least one electromechanical apparatus 32 that can be controlled by the electrical control unit 31. In one embodiment, the electromechanical apparatus 32 may include, for example, windows, lights, seats, air conditioners, audio devices, camera devices, advanced driver assistance system and other electronic devices that can be controlled by electronic signals, but it is not limited thereto. In one embodiment, the user may use gestures, voice, mobile devices or operating buttons of the vehicle 100 to operate the electromechanical apparatus 32 or adjust parameter settings of the electromechanical apparatus 32, so that the electromechanical apparatus 32 may be regarded as part of the components on the vehicle 100.

The controller area network 50 is, for example, a bus for signal transmission in a car. In one embodiment, when the user wants to operate components on the vehicle 100 using gestures, voice, mobile devices or operating buttons, the data (including but not limited to data obtained and converted from parsing, encoding or converting gestures or voice, data corresponding to operating buttons, or data transmitted by a mobile device) may first be received by the vehicle system 10, and then the vehicle system 10 transmits the data or conversion data to the in-vehicle display system 20 or the electronic control system 30 through the controller area network 50, while it is not limited thereto. The "data" here may, for example, include information signal or control signal, while it is not limited thereto.

In one embodiment, the detection and authentication system 40 may be disposed in the vehicle 100, but in another embodiment, at least part of the detection and authentication system 40 may also be disposed outside the vehicle 100. For example, at least part of the detection and authentication system 40 may also be provided on a mobile device or a cloud device, but it is not limited thereto. In one embodiment, the detection and authentication system 40 may, for example, include a functional module with functions implemented by executing a computer program product on a processor of the vehicle 100, the mobile device and/or the cloud device, but it is not limited thereto. In one embodiment, the detection and authentication system 40 may include a position detection system 41, a permission setting system 42 and a verification system 43, but it is not limited thereto.

The position detection system 41 may be used to detect the position of the command output source in the vehicle 100. In one embodiment, the position detection system 41 may obtain the position information of the first command output source 1 or the second command output source 2 through a camera device (for example, but not limited to, various photographic lenses or sensing devices, where the sensing device may be, for example, but not limited to, an infrared light sensing device) disposed in the vehicle 100. However, in another embodiment, when the command output source is a mobile device, the position detection system 41 may obtain the position information of the first command output source 1 or the second command output source 1 through the positioning function of the first command output source 1 or the second command output source 2, but it is not limited thereto.

The permission setting system 42 may set the permission of the command output source according to the position of the command output source. For example, the permission of the first command output source 1 adjacent to the driver seat 101 may be set as the first permission, and the permission of the command output source 2 other than the command output source 1 adjacent to the driver seat 101 (in other words, adjacent to the passenger seat 102 or the rear seat 103 and away from the driver seat 101) may be set as the second permission. In one embodiment, the first permission may correspond to a control condition of the component on the vehicle 100, and the second permission may correspond to another control condition of the component on the vehicle 100, wherein the control condition of the first permission is superior to the control condition of the second permission, for example. For example, the number of the types of components that can be operated with the first permission is more than that with the second permission, while it is not limited to this. The "control condition" here refers to, for example, the controllable type, quantity or parameters of the components on the vehicle 100, but it is not limited thereto.

When the first command output source 1 or the second command output source 2 is a mobile device, the verification system 43 may be used to verify the mobile device. For example, the verification system 43 may verify whether the first command output source 1 or the second command output source 2 is registered in the vehicle 100. When the first command output source 1 or the second command output source 2 has been registered in the mobile vehicle 100, the vehicle 100 will allow the first command output source 1 and/or the second instruction output source 22 to operate the components on the vehicle 100, while it is not limited thereto. In one embodiment, the first command output source 1 or the second command output source 22 may be registered in advance, so that the verification system 43 may automatically complete verification when the first command output source 1 or the second command output source 22 enters the vehicle 100, but it is not limited thereto. In another embodiment, the first command output source 1 or the second command output source 22 may not be registered in advance and, for example, may immediately perform registration when issuing a request to operate component of the vehicle 100, but it is not limited thereto.

Figure 3:
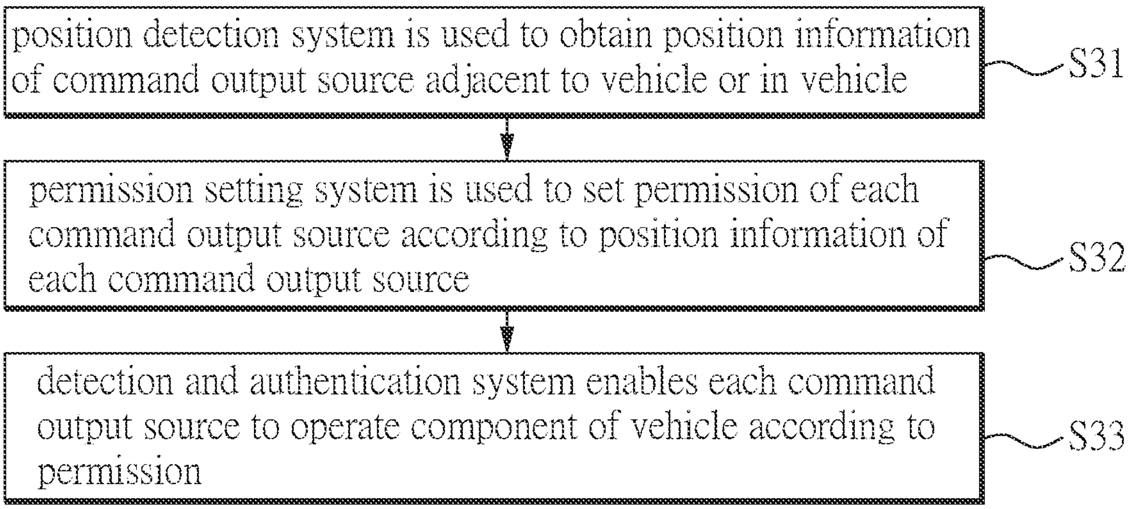
FIG. 3 is an operating flowchart of the detection and authentication system according to an embodiment of the present disclosure.

Next, the operation details of the detection and authentication system 40 will be described. FIG. 3 is an operating flowchart of the detection and authentication system 40 according to an embodiment of the present disclosure, and please refer to FIG. 1 and FIG. 2A for assistance. The operating process of the detection and authentication system 40 may be part of the operating method for a vehicle of the present disclosure.

As shown in FIG. 3, step S31 is first executed, in which the position detection system 41 executes a position identification procedure to obtain the position information of the command output source adjacent to the vehicle 100 or in the vehicle 100. If the position information of the command output source cannot be obtained, it indicates that the command output source is not close to the vehicle 100 yet. Then, step S32 is executed, in which the permission setting system 42 sets the permission of each command output source according to the position information of each command output source. Then, step S33 is executed, in which the detection and authentication system 40 enables the vehicle 100 to make the operating permissions of the components of the vehicle 100 open, so that each command output source may operate the components of the vehicle 100 according to its own permission. As a result, the main operating process of the detection and authentication system 40 can be understood.

Next, the operating modes of different permissions of the command output source will be described, and please refer to FIG. 2A and FIG. 2B again. As shown in FIG. 2A, after the verification system 43 verifies the identity of the first command output source 1, the detection and authentication system 40 may make most components of the vehicle 100 open according to the first permission for the first command output source 1 to operate. In contrast, as shown in FIG. 2B, after the verification system 43 verifies the identity of the second command output source 2, the detection and authentication system 40 may make part of the components of the vehicle 100 open according to the permission of the second mobile device 2 for the second command output source 2 to operate. Since the permission of the second command output source 2 is the second permission, the number and/or type of components of the vehicle 100 that the second command output source 2 may operate may be less than the number and/or types of components of the vehicle 100 that the first command output source 2 may operate. For example, the second command output source 2 may only operate the window display 22, but cannot operate the dashboard display 21 or the head-up display 23 that may affect driving, and the first command output source 1 may operate the dashboard display 21, the window display 22, the head-up display 23 and other displays, while it is not limited thereto.

Accordingly, through the operating method for a vehicle of the present disclosure, most of the components on the vehicle 100 may be operated by the first command output source 1 with the first permission, and the second command output source 2 may operate the components that are less likely to affect driving safety or the components adjacent thereto. Through the above mechanism, the driving safety can be improved.

Figure 4A:
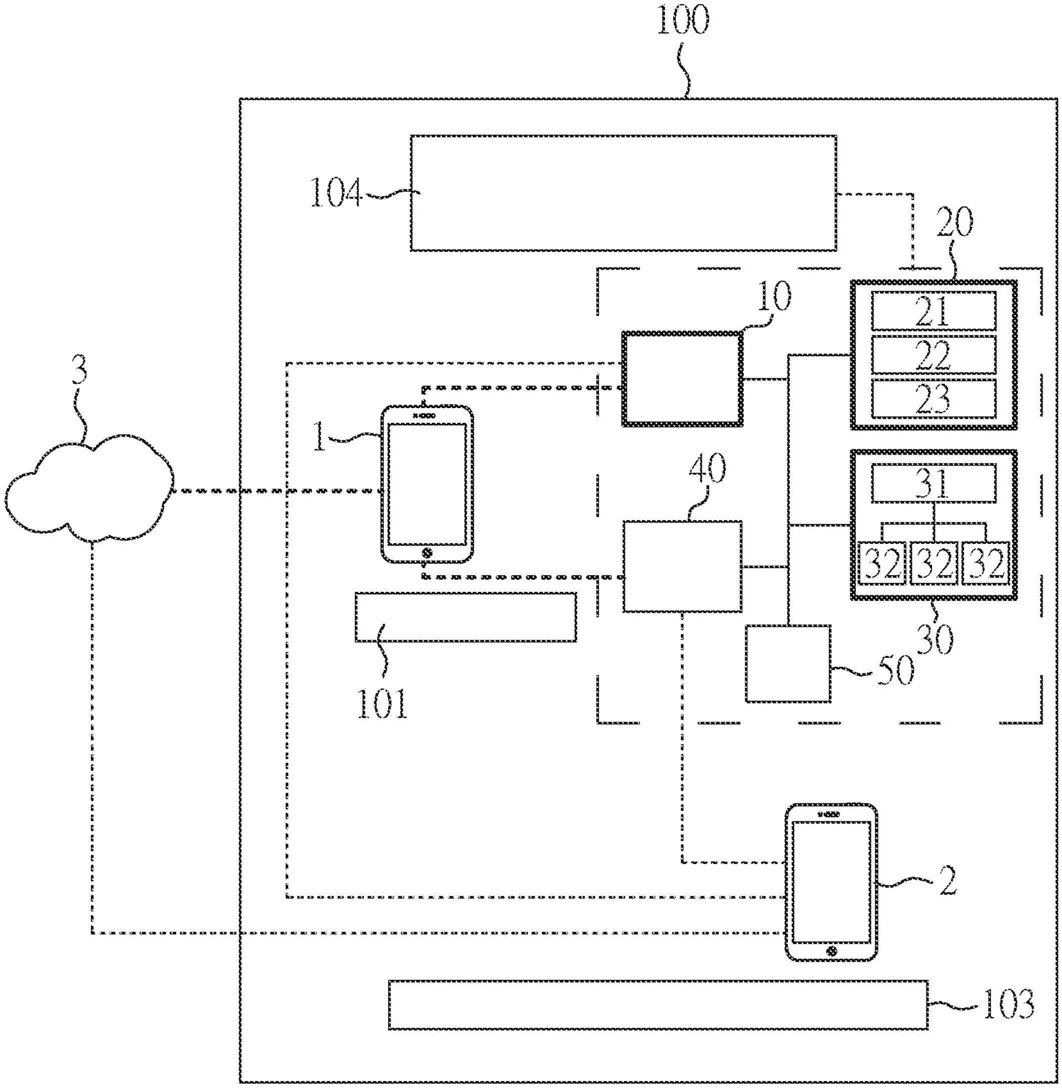
FIG. 4A is a schematic diagram of the first command output source, vehicle and cloud device according to an embodiment of the present disclosure.
Figure 4B:
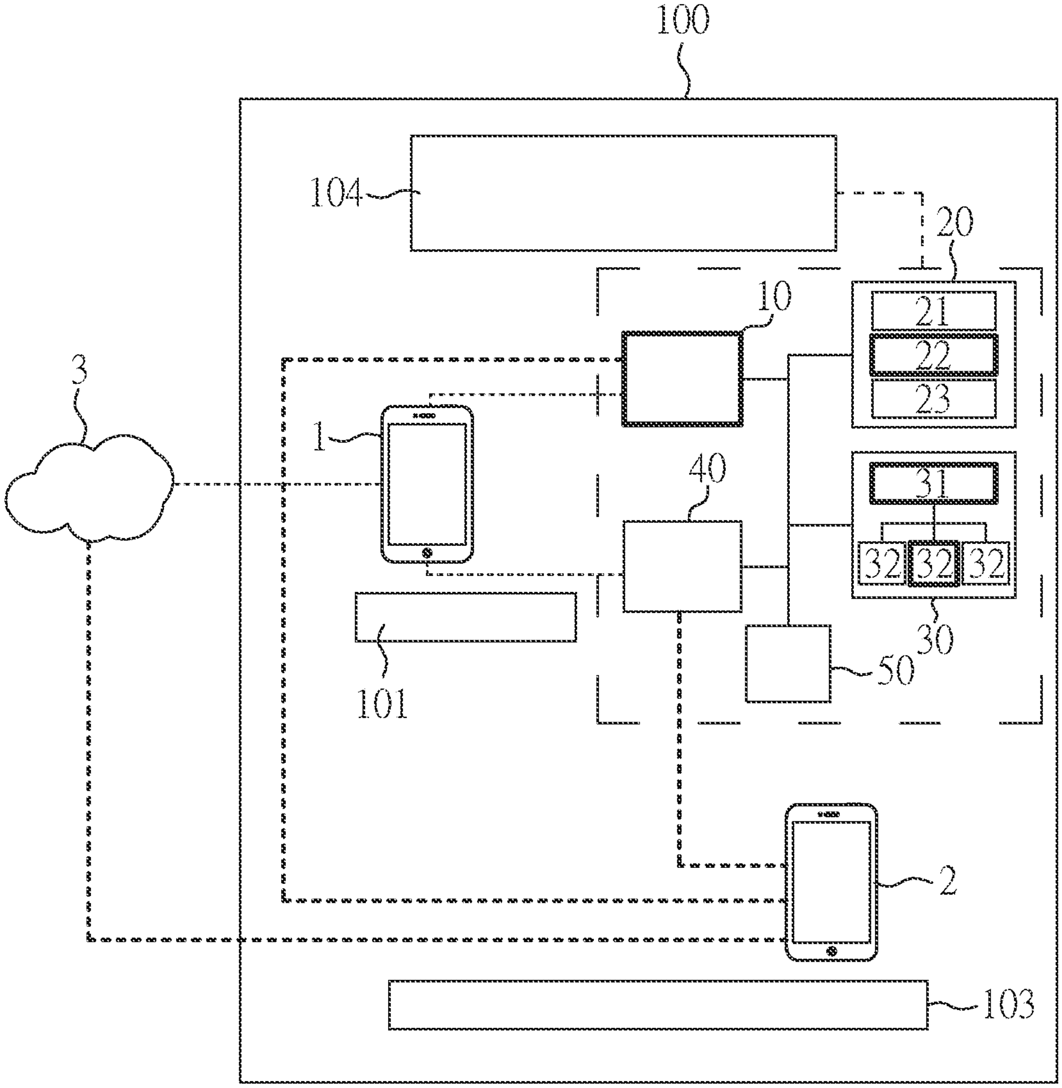
FIG. 4B is a schematic diagram of the second command output source, vehicle and cloud device according to an embodiment of the present disclosure.

In addition, the command output source may also be used with a cloud device to operate components on the vehicle 100, and please refer to FIG. 4A and FIG. 4B, as well as FIGS. 1 to 3 for assistance. FIG. 4A is a schematic diagram of the first command output source 1, the vehicle 100 and the third command output source 3 according to an embodiment of the present invention. FIG. 4B is a schematic diagram of the second command output source 2, the vehicle 100 and the third command output source 3 according to an embodiment of the present invention. In FIG. 4A and FIG. 4B, the first command output source 1 and the second command output source 2 are exemplified by a mobile device, and the third command output source 3 is exemplified by a cloud device.

As shown in FIG. 4A, when the verification system 43 (shown in FIG. 2A) verifies the identity of the first command output source 1 (for example, a mobile device), the first command output source 1 may operate the components on the vehicle 100 according to the first permission. The vehicle 100 may also receive stored data related to the first command output source 1 transmitted from the third command output source 3 (for example, the cloud device) through the first command output source 1, or the first command output source 1 may also operate the components on the carrier 100 through the third command output source 3, while it is not limited thereto. In one embodiment, the type of stored data related to the first command output source 1 may include information on the user's usage habits of vehicle, preset operating commands of the first command output source 1, information or user's personal information transmitted to the third command output source 3 in advance, etc., while it is not limited thereto.

Similarly, as shown in FIG. 4B, after the verification system 43 (shown in FIG. 2A) verifies the identity of the second command output source 2 (for example, a mobile device), the second command output source 2 may operate the components on the vehicle 100 according to the second permission, and the vehicle 100 may also receive stored data related to the second command output source 2 transmitted from the third command output source 3 (such as a cloud device) through the second command output source 2, or the second command output source 2 may also operate components of the vehicle 100 through the third command output source 3, while it is not limited thereto. In one embodiment, the type of stored data related to the second command output source 2 may include information on the user's usage habits of vehicle, preset operating commands of the second command output source 2, information or user's personal information transmitted to the third command output source 3 in advance by the second command output source, etc., while it is not limited thereto.

The above description about the third command output source 3 is only an example but not a limitation.

Figure 5A:
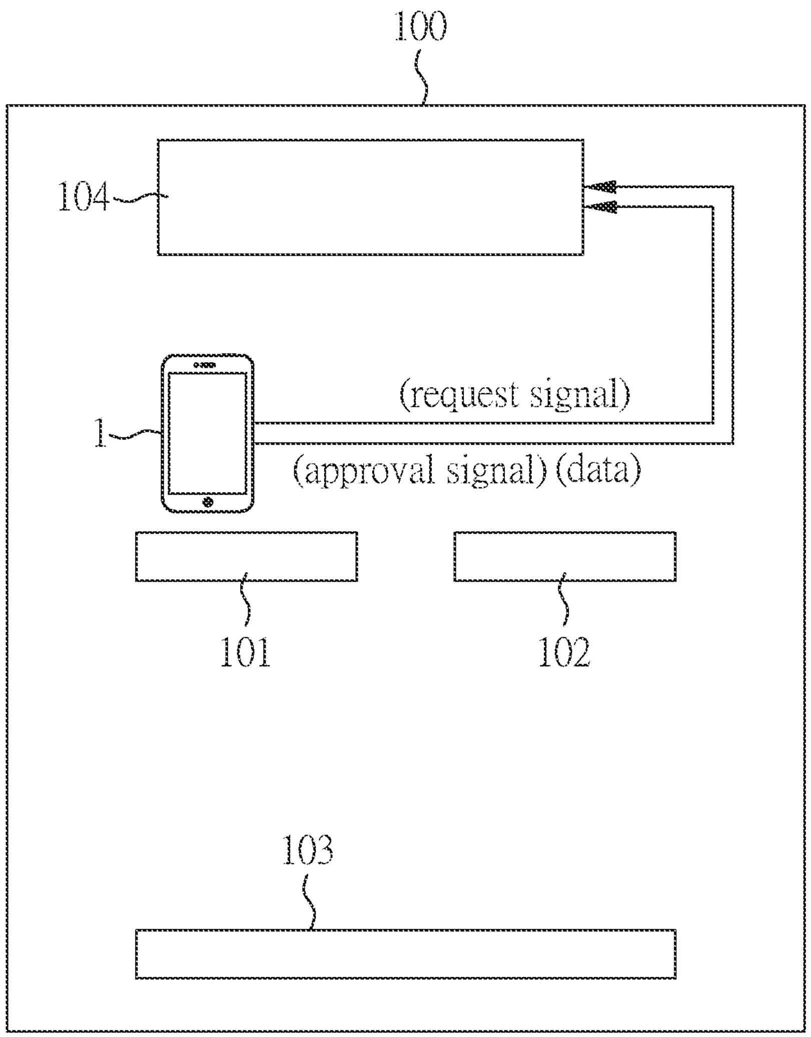
FIG. 5A is an operating scenario diagram of the operating method for a vehicle according to the first embodiment of the present disclosure.
Figure 5B:
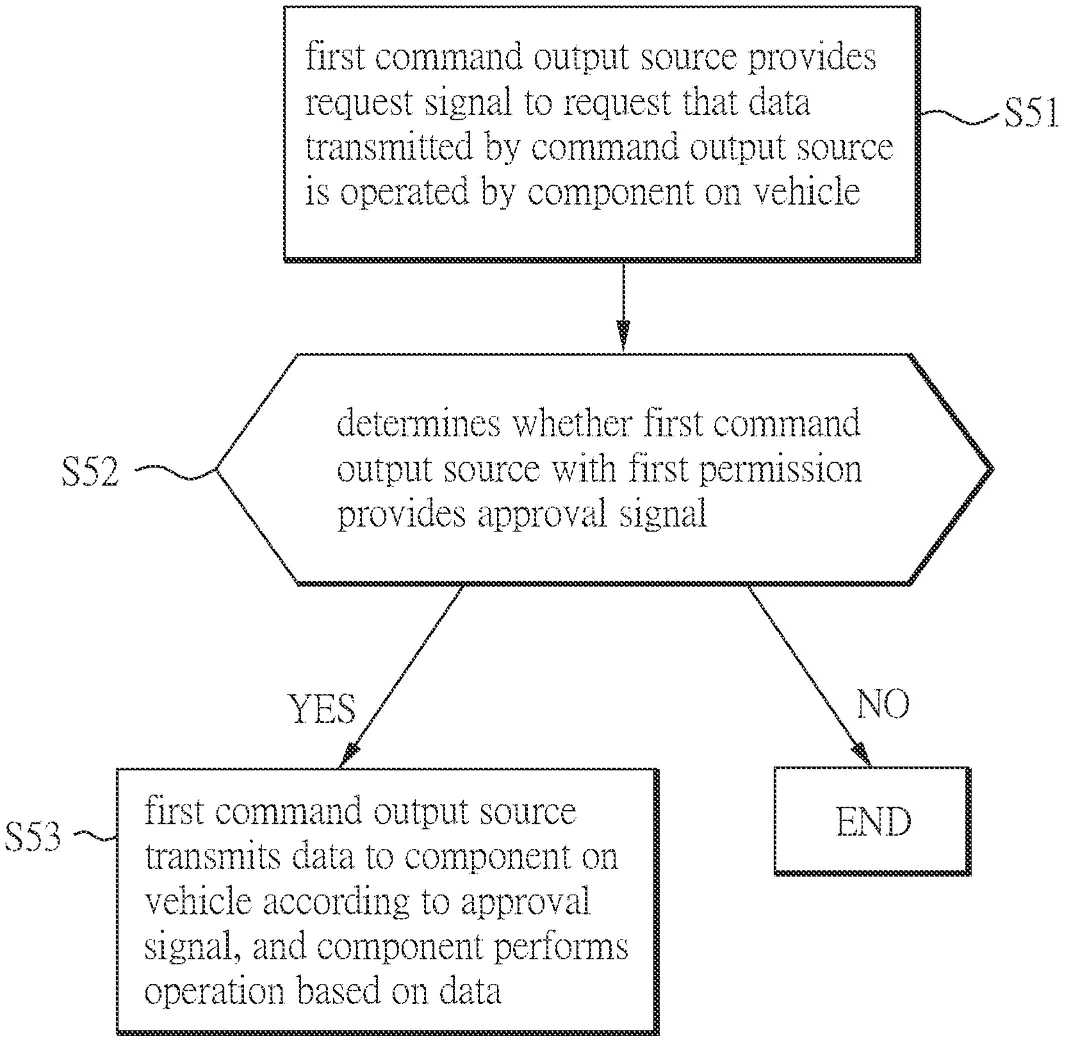
FIG. 5B is a flowchart illustrating the steps corresponding to the operating method for a vehicle of FIG. 5A.

Next, the detailed operating process of the operating method for a vehicle of the present disclosure will be described. FIG. 5A is an operating scenario diagram of the operating method for a vehicle according to the first embodiment of the present disclosure, FIG. 5B is a flowchart illustrating the steps corresponding to the operating method for a vehicle of FIG. 5A, and please also refer to FIG. 1 to FIG. 4B for assistance, wherein FIG. 5A and FIG. 5B illustrate the situation in which there is only a single command output source (for example, the first command output source 1) in the vehicle 100. In FIG. 5A and FIG. 5B, a mobile device is taken as an example of the first command output source 1 and, from the examples in FIG. 5A and FIG. 5B, those skilled in the art may infer the implementation aspect style that the command output source is the user or the operating buttons of the vehicle 100.

As shown in FIG. 5A and FIG. 5B, step S51 is first executed, in which the first command output source 1 (such as the driver's mobile device) provides a request signal to the vehicle 100 to request that the data transmitted by the command output source 1 may be operated by the component on the vehicle 100, such as receiving the data. Since the first command output source 1 has the first permission, step S52 is then executed to determine whether the first command output source 1 with the first permission provides an approval signal to the vehicle 100 so as to determine to allow the component on the vehicle to operate the data. Then, step S53 is executed, in which, according to the approval signal, the first command output source 1 transmits the data or the conversion data converted from the data to the component on the vehicle 100, and the component may perform operation based on the data from the first command output source 1 or the conversion data converted from the data. In different embodiments, the data or the conversion data converted from the data may be provided by the first command output source 1 to the components on the vehicle 100 at any stage.

Regarding step S51, in one embodiment, since there is only the first command output source 1 in the vehicle 100, the detection and authentication system 40 (shown in FIG. 2A) may automatically set the permission of the first command output source 1 to be the first permission, or the position detection system 41 of the detection and authentication system 40 does not need to operate when there is only a single command output source within the range of the vehicle 100. However, in another embodiment, the position detection system 41 may also operate. In addition, in one embodiment, the request signal may be transmitted to the vehicle 100 first, and then the vehicle 100 requests the first command output source 1 to provide the approval signal, thereby reducing the risk of affecting the driving safety due to accidental touch on the first command output source 1, but it is not limited thereto. In one embodiment, after generating the request signal, the first command output source 1 (for example, a driver's mobile device) may automatically generate and provide an approval signal to the vehicle 100. However, in another embodiment, only after being confirmed by the user's operation, the first command output source 1 (such as a mobile device) may generate and provide the approval signal to the vehicle 100. In addition, in one embodiment, the vehicle 100 and the mobile device may be connected for transmission through various wireless communication technologies (such as but not limited to Bluetooth, WiFi, 4G, 5G, etc.) or wired communication technologies (such as but not limited to transmission lines, etc.), while it is not limited thereto. In addition, it is noted that, in other implementations, when the command output source is the user, the request signal or the approval signal (or a rejection signal) may be converted from the user's gesture, voice, fingerprint, appearance, and movement, while it is not limited thereto. Alternatively, when the command output source is the operating buttons of the vehicle 100, the request signal or the approval signal (or a rejection signal) may correspond to one of the operating buttons, while it is not limited thereto.

In step S52, the first command output source 1 may provide and transmit an approval signal to the vehicle 100, so that the vehicle 100 makes a component open to allow the first command output source 1 to operate. In addition, in steps S51 and S52, if the first command output source 1 provides a rejection signal, or when the first command output source 1 does not provide an approval signal to the vehicle 100 after exceeding a predetermined waiting time, which is deemed that the first command output source 1 provides a rejection signal (that is, does not provide an approval signal), this process of the operating method will be ended. In addition, in step S52, the act of determining whether the first command output source 1 provides the approval signal may be performed by at least one of the vehicle 100, the first command output source 1 or the cloud device, while it is not limited thereto.

In step S53, after the first command output source 1 provides the approval signal to the vehicle 100, the first command output source 1 transmits the data or the conversion data converted from the data to the components on the vehicle 100, and the components on the vehicle 100 operate according to the data from the first command output source 1 or the conversion data converted from the data. In one embodiment, the first command output source 1 (for example, a mobile device) provides the data after providing an approval signal to the vehicle 100. In one embodiment, the first command output source 1 (for example, a mobile device) may also pre-generate the data before providing the request signal, and the data may be transmitted to the vehicle 100 together with the request signal or separately, or the data may be transmitted to the vehicle 100 together with the approval signal or separately, while it is not limited thereto. It is noted that, in other examples, when the command output source is the user or the operating buttons, the user or the operating buttons may send a command to another electronic device to cause the other electronic device to generate data, while it is not limited thereto.

Please refer to FIG. 2A, FIG. 5A and FIG. 5B. In one embodiment, the first command output source 1 may first transmit the data to the vehicle system 10, and the vehicle system 10 may then transmit the data or the conversion data converted from the data to the component of the corresponding vehicle 100 through the controller area network 50, while it is not limited thereto. For example, in one embodiment, when the request signal is a request to display navigation information provided by the first command output source 1 on the in-vehicle display system 20, the data at this moment may include the navigation information itself, and the first command output source 1 may first transmit the navigation information to the navigation system 11 of the vehicle system 10, and then the navigation system 11 transmits the navigation information or the conversion data converted according to the navigation information to at least one display in the in-vehicle display system through the controller area network 50, while it is not limited thereto. In addition, in other embodiments, the data may also be replaced with other types of information, such as entertainment information or communication information that can be displayed or played on components of the vehicle 100, while it is not limited thereto. Alternatively, in one embodiment, when the request signal is a request to play music, the "data" may include a control signal, and the first command output source 1 may first transmit the control signal to the vehicle entertainment system 12 of the vehicle system 10. The vehicle entertainment system 12 then transmits the control signal or the conversion data converted according to the control signal to the electronic control system 30 through the controller area network 50, so that the electronic control system 30 controls the audio device of the vehicle 100 to play music, while it is not limited thereto. Alternatively, when the request signal is a request to control the electromechanical apparatus 32 (for example, for adjusting the vehicle windows), the "data" at this moment may include the control signal, and the first command output source 1 may first transmit the control signal to the electromechanical control system 13 of the vehicle system 10, and then the electromechanical control system 13 transmits the control signal or the conversion data converted according to the control signal to the electronic control system 30 through the controller area network 50, so that the electronic control system 30 controls and adjusts the vehicle windows, while it is not limited thereto. The above description is only an example but not a limitation.

As a result, the operating method for a vehicle of the first embodiment can be understood.

Figure 6A:
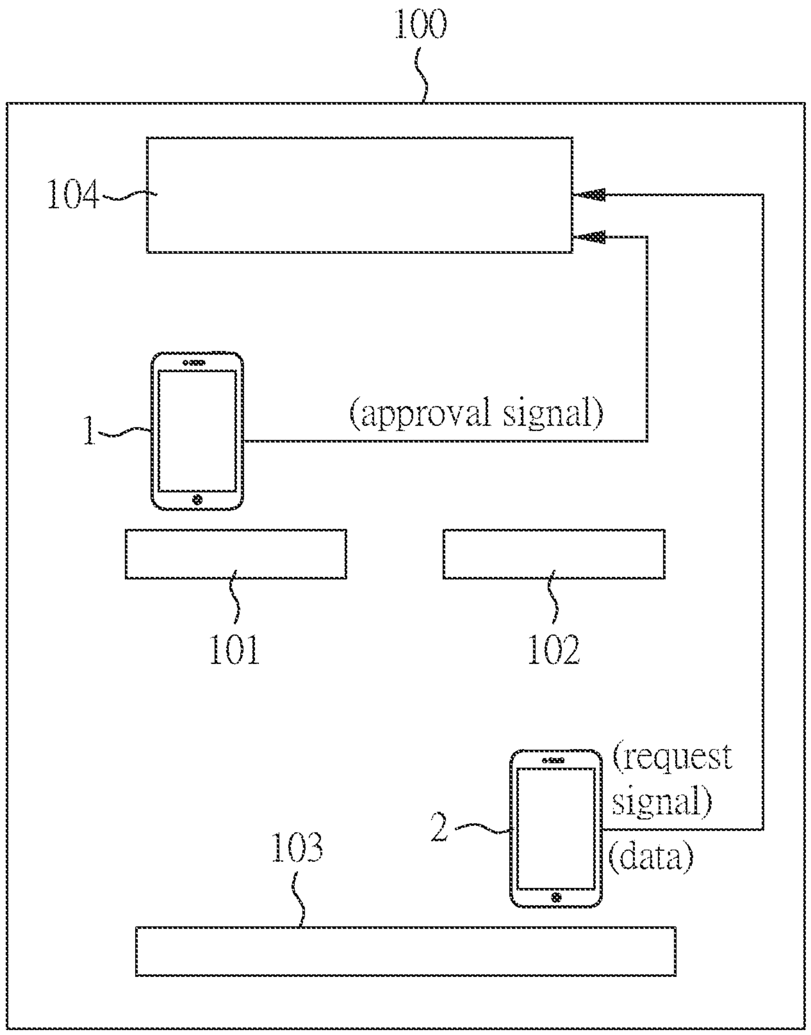
FIG. 6A is an operating scenario diagram of the operating method for a vehicle according to the second embodiment of the present disclosure.
Figure 6B:
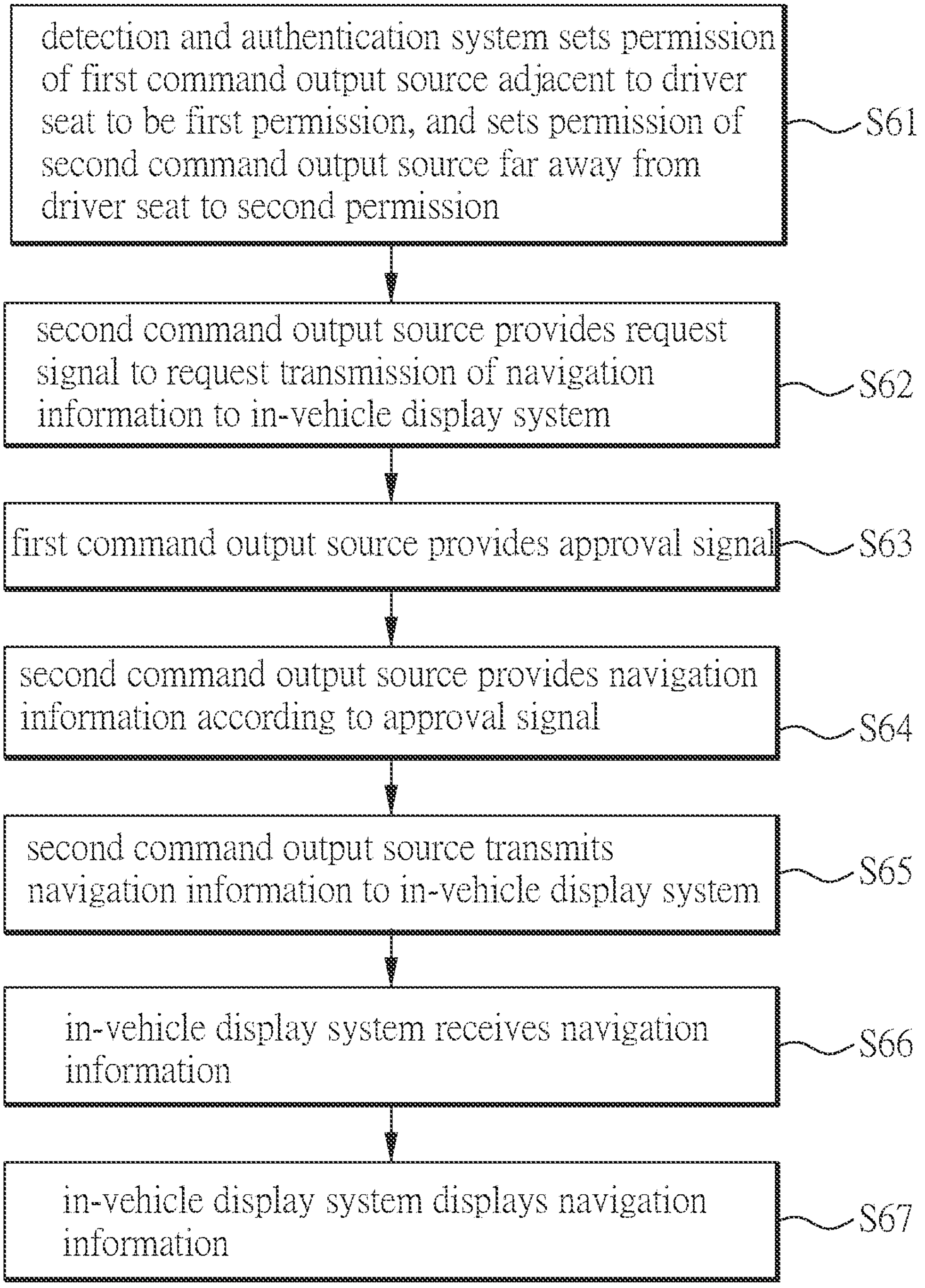
FIG. 6B is a flowchart illustrating the steps corresponding to the operating method for a vehicle of FIG. 6A.

The operating method for a vehicle of the present disclosure may have different aspects. FIG. 6A is an operating scenario diagram of the operating method for a vehicle according to the second embodiment of the present disclosure, FIG. 6B is a flowchart illustrating the steps corresponding to the operating method for a vehicle of FIG. 6A, and please refer to FIG. 1 to FIG. 5B for assistance, wherein the examples of FIG. 6A and FIG. 6B are for the situation where there are both the first command output source 1 and the second command output source 2 within the range of the vehicle 100, and the second command output source 2 intends to transmit data or conversion data converted from the data to the components on the vehicle 100, and where the data is navigation information. It is noted that, in the actual application, the data is not limited to navigation information. In FIG. 6A and FIG. 6B, the first command output source 1 and the second command output source 2 are exemplified by mobile devices and, from the examples of FIG. 6A and FIG. 6B, those skilled in the art may infer the implementation aspect that the command output source is the user or the operating buttons of the vehicle 100.

As shown in FIG. 6A and FIG. 6B, step S61 is first executed, in which the detection and authentication system 40 (shown in FIG. 2A) is used to set the permission of the first command output source 1 adjacent to the driver seat 101 to be the first permission according to the positions of the first command output source 1 and the second command output source 2, and to set the permission of the second command output source 2 other than the first command output source 1 adjacent to the driver seat 101 (in other words, the second command output source 2 far away from the driver seat 101) to the second permission. Then step S62 is executed, in which the second command output source 2 provides a request signal to the vehicle 100 to request the transmission of navigation information to the component on the vehicle 100 (for example, the in-vehicle display system 20 in FIG. 2A). Then, step S63 is executed, in which the first command output source 1 provides an approval signal to the vehicle 100 to allow the second command output source 2 to transmit navigation information to the in-vehicle display system 20. In addition, if the first command output source 1 provides a rejection signal or does not respond after a predetermined waiting time, the vehicle 100 and/or the second command output source 2 will end this process. Then, step S64 is executed, in which the second command output source 2 provides navigation information according to the approval signal. Then, step S65 is executed, in which the second command output source 2 is used to transmit the navigation information to the in-vehicle display system 20. Then, step S66 is executed, in which the in-vehicle display system 20 is used to receive the navigation information or the conversion information converted from the navigation information from the second command output source 2. Then, step S67 is executed, the in-vehicle display system 20 displays the navigation information or the conversion information converted from the navigation information.

Regarding step S61, the description of the example in FIG. 3 may be applicable to the details of this step, and thus a detailed description is deemed unnecessary.

Regarding steps S62 to S67, most of the descriptions of steps S51 to S53 in FIG. 5B may be applicable to the details of these steps, and thus only the differences will be described below.

In step S62, the second command output source 2 may first transmit the request signal to the vehicle 100, and then the vehicle 100 requests the first command output source 1 to provide an approval signal, or the second command output source 2 may also directly transmit the request signal to the first command output source 1, while it is not limited thereto.

In step S64, although the second command output source 2 provides navigation information (i.e., data) after the approval signal is provided, in other embodiments, the navigation information may be generated in advance before the approval signal is provided or before the permission is set (for example, step S61), while it is not limited thereto.

In step S66, although the vehicle display system 20 on the vehicle 100 receives the navigation information after the approval signal is provided, in other embodiments, the data may be received in advance before the approval signal is provided or before the permission is set (for example, step S61), while it is not limited thereto.

As a result, the operating method for a vehicle of the second embodiment can be understood.

Figure 7A:
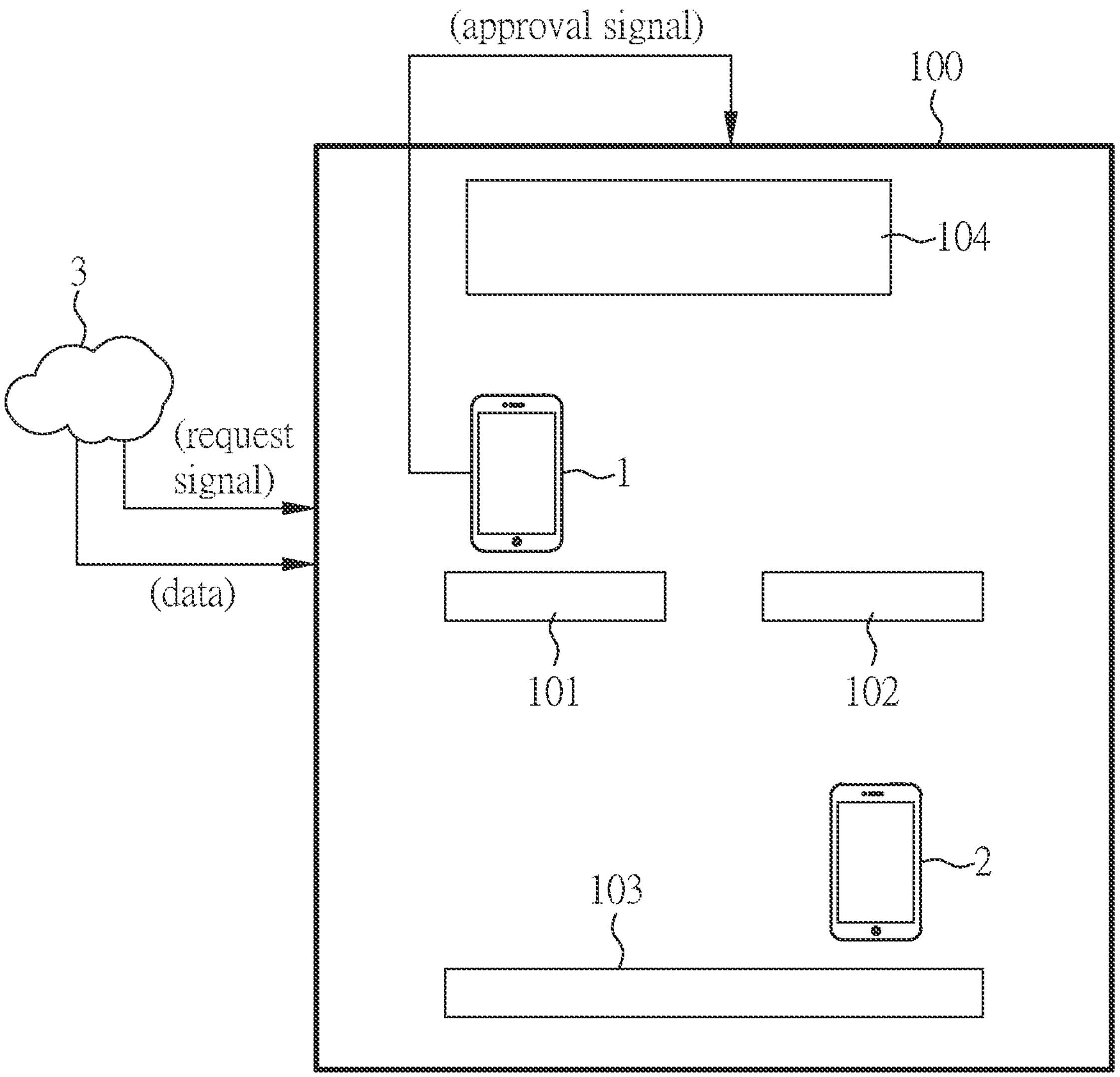
FIG. 7A is an operating scenario diagram of the operating method for a vehicle according to the third embodiment of the present disclosure.
Figure 7B:
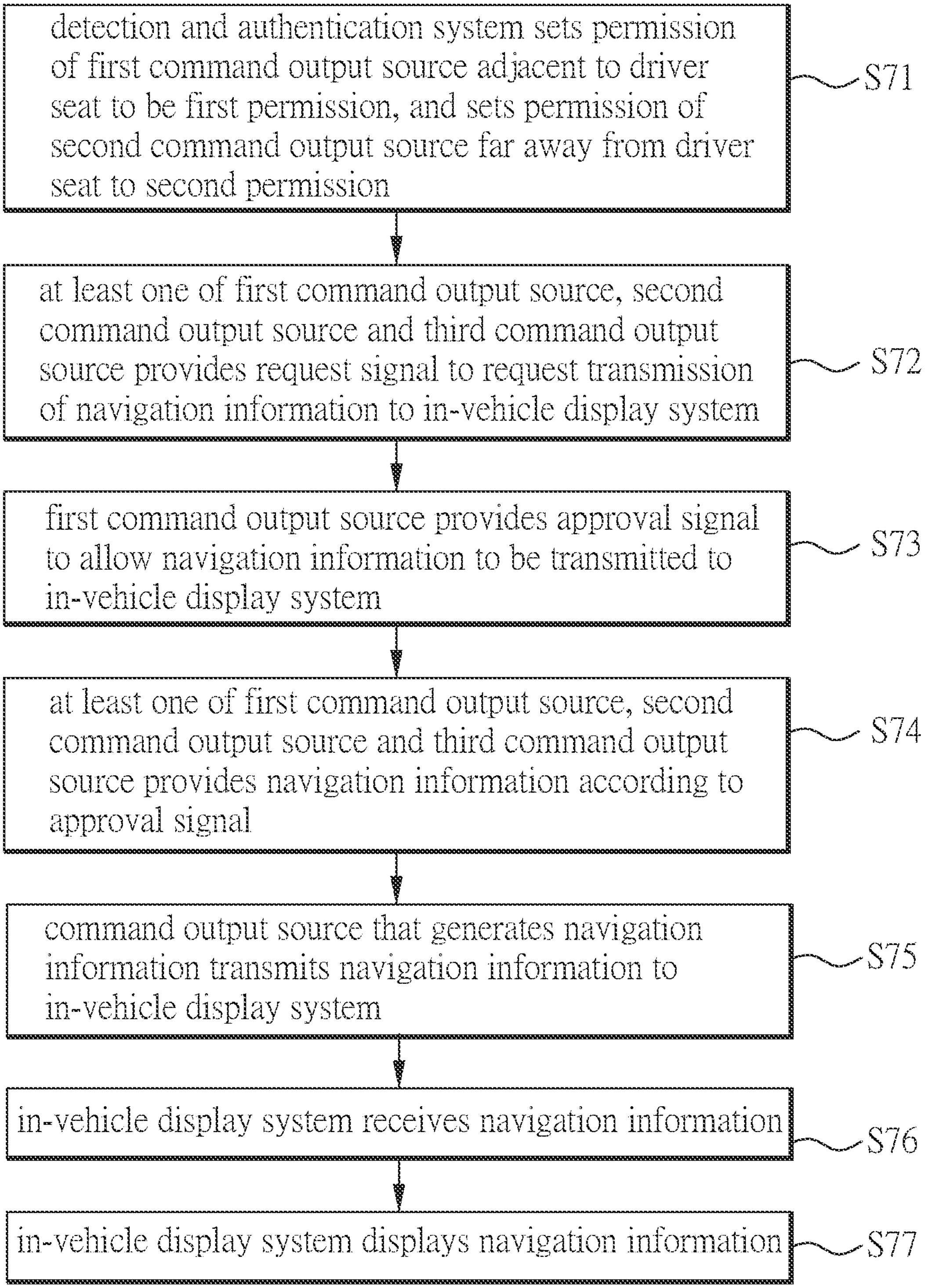
FIG. 7B is a flowchart illustrating the steps corresponding to the operating method for a vehicle of FIG. 7A.

The operating method for a vehicle of the present disclosure may also have different aspects. FIG. 7A is an operating scenario diagram of the operating method for a vehicle according to the third embodiment of the present disclosure, FIG. 7B is a flowchart illustrating the steps corresponding to the operating method for a vehicle of FIG. 7A, and please refer to FIG. 1 to FIG. 6B for assistance. FIG. 7A and FIG. 7B provide an example implemented with a cloud device, which is exemplified by the mobile device or cloud device transmitting data (such as navigation information) or conversion data converted from the data to the components of the vehicle 100. It is noted that, in the actual application, the data is not limited to navigation information. In FIG. 7A and FIG. 7B, the first command output source 1 and the second command output source 2 are exemplified by a mobile device, the third command output source 3 is exemplified by a cloud device, and the data is exemplified by navigation information and, from the examples of FIG. 7A and FIG. 7B, those skilled in the art may deduce the implementation aspect that the first command output source 1 and the second command output source 2 are users or operating buttons of the vehicle 100.

As shown in FIG. 7A and FIG. 7B (as well as FIG. 4A), step S71 is first executed, in which the detection and authentication system 40 is used to set the permission of the first command output source 1 adjacent to the driver seat 101 to be the first permission according to the positions of the first command output source 1 and the second command output source 2, and to set the permission of the second command output source 2 other than the first command output source 1 adjacent to the driver seat 101 (in other words, the second command output source 2 far away from the driver seat 101) to the second permission. Then step S72 is executed, in which at least one of the first command output source 1, the second command output source 2 and the third command output source 3 provides a request signal to the vehicle 100 to request the transmission of navigation information to the components (e.g., in-vehicle display system 20) on the vehicle 100. Then, step S73 is executed, in which the first command output source 1 provides an approval signal to the vehicle 100 to allow the navigation information to be transmitted to the in-vehicle display system 20. In addition, if the first command output source 1 provides a rejection signal or does not respond after a predetermined waiting time, this process of the operating method will be ended. Then, step S74 is executed, in which at least one of the first command output source 1, the second command output source 2 and the third command output source 3 provides navigation information according to the approval signal. Then, step S75 is executed, in which the command output source that generates navigation information is used to transmit the navigation information to the in-vehicle display system 20. Then, step S76 is executed, in which the in-vehicle display system 20 is used to receive the navigation information or the conversion information converted from the navigation information. Then, step S77 is executed, the in-vehicle display system 20 displays the navigation information.

Regarding step S71, the description of the example in FIG. 3 is applicable to the details of this step, and thus a detailed description is deemed unnecessary.

Regarding step S72, the situation that the third command output source 3 provides the request signal is described here. In one embodiment, after the first command output source 1 or the second command output source 2 passes the verification system 43, the vehicle 100 makes the permission open so that the third command output source 3 may transmit stored data related to the first command output source 1 and/or the second command output source 2 to the vehicle 100. At this moment, the request signal may be sent by at least one of the first command output source 1, the second command output source 2 and the third command output source 3 to the mobile vehicle 100 or the first command output source 1 to request the first command output source 1 to provide an approval signal, but it is not limited thereto.

Regarding step S73, the description of step S52 or step S63 may be applicable to this step, and thus a detailed description is deemed unnecessary.

Regarding step S74, in one embodiment, if the navigation information is generated by the first command output source 1 or the second command output source 2, the first command output source 1 or the second command output source 2 may transmit the navigation information to the vehicle 100, but may also first transmit the navigation information to the third command output source 3 for being then transmitted to the vehicle 100 by the third command output source 3. In another embodiment, if the navigation information is generated by the third command output source 3, the third command output source 3 may transmit the navigation information to the vehicle 100, but may also first transmit the navigation information to the first command output source 1 or the second command output source 2 for being then transmitted to the vehicle 100 by the first command output source 1 or the second command output source 2. However, the present disclosure is not limited thereto.

Regarding steps S76 to S77, the descriptions of steps S66 to S67 may be applicable to these steps, and thus a detailed description is deemed unnecessary.

As a result, the operating method for a vehicle of the third embodiment can be understood.

Embodiments of the present disclosure also provide a computer-readable storage medium on which a computer program is stored. The computer program may be used to cause the computer to execute any of the operating methods of any one of the above embodiments.

Embodiments of the present disclosure also provide a nonvolatile computer-readable storage medium. One or more program modules are stored in the storage medium. When one or more program modules are used on a device, the device may be caused to execute instructions for steps included in any one of the embodiments described above.

The aforementioned computer-readable storage medium may be, for example (but not limited to) an electrical, magnetic, optical, electromagnetic, infrared or semiconductor device or apparatus, or a combination thereof. More specific examples of computer-readable storage media may include, but are not limited to, portable computer disks, hard disks, random access memory (RAM), read-only memory (ROM), erasable programmable read-only memory (EPROM), optical fiber, CD-ROM, optical storage apparatus, magnetic storage apparatus, or a combination thereof.

In one embodiment, the present disclosure may at least determine whether a product at issue falls within the protection scope of the present disclosure by the operating mode of the product at issue, or may determine whether a product at issue falls within the protection scope of the present disclosure by using the algorithm of the product at issue, while it is not limited thereto. In one embodiment, the algorithm of the product at issue may be obtained, for example, through reverse engineering, but it is not limited thereto.

The details or features of the various embodiments of the present disclosure may be mixed and matched as long as they do not violate the spirit of the invention or conflict with each other.

As a result, the operating method for a vehicle of the present disclosure allows the driver or passenger to use the mobile device or cloud device to operate the components of the vehicle 100. Alternatively, all operating requests sent by the mobile device or cloud device have to be approved by the driver, so as to prevent the components of the vehicle 100 that may affect driving safety from being operated. Alternatively, different permissions are given to mobile devices at different positions to prevent the components of the vehicle 100 that may affect driving safety from being operated by users other than the driver.

The aforementioned specific embodiments should be interpreted as merely illustrative, and not limiting the rest of the present disclosure in any way, and the features of different embodiments may be mixed and matched as long as they do not conflict with each other.

The invention claimed is:

1. An operating method for a vehicle, which operates the vehicle through at least one command output source, comprising the steps of:

providing a request signal to the vehicle to request transmission of data to at least one component on the vehicle;

providing an approval signal to the vehicle;

the at least one command output source transmitting the data to the at least one component according to the approval signal;

enabling the at least one component to operate according to the data;

the vehicle setting one of the at least one command output source to have a first permission according to position information of the at least one command output source; and using the command output source with the first permission to provide the approval signal.

2. The operating method as claimed in claim 1, wherein the command output source with the first permission is adjacent to a driver seat of the vehicle, and the first permission corresponds to a control condition of the at least one component.

3. The operating method as claimed in claim 2, further comprising the steps of:

the vehicle setting another command output source other than the command output source adjacent to the driver seat to have a second permission, wherein the second permission corresponds to another control condition of the at least one component, wherein the control condition corresponding to the first permission is superior to the control condition corresponding to the second permission.

4. The operating method as claimed in claim 2, wherein the data is from the command output source with the first permission.

5. The operating method as claimed in claim 3, wherein the data is from the command output source with the second permission.

6. The operating method as claimed in claim 3, wherein the data is from a cloud device.

7. The operating method as claimed in claim 1, wherein the data includes navigation information, the at least one component includes at least one display, and the step of enabling the at least one component to operate according to the data includes: enabling the at least one display to display the navigation information.

8. The operating method as claimed in claim 7, wherein a type of the at least one display includes a dashboard display, a cluster display, a head-up display, a center information device or a vehicle window, or a combination thereof.

9. The operating method as claimed in claim 1, wherein the data includes a control signal, the at least one component includes at least one electromechanical apparatus, and the step of enabling the at least one component to operate according to the data includes: enabling the at least one electromechanical apparatus to operate according to the control signal.

10. An operating method for a vehicle, which operates the vehicle through at least one command output source, comprising the steps of:

providing a request signal to the vehicle to request transmission of data to at least one component on the vehicle;

providing an approval signal to the vehicle;

the at least one command output source transmitting the data to the at least one component according to the approval signal; and enabling the at least one component to operate according to the data, wherein the request signal is first transmitted to the vehicle, and then the vehicle requests the at least one command output source to provide the approval signal.

11. The operating method as claimed in claim 1, wherein, after generating the request signal, the at least one command output source automatically generates and provides the approval signal to the vehicle.

12. An operating method for a vehicle, which operates the vehicle through at least one command output source, comprising the steps of:

providing a request signal to the vehicle to request transmission of data to at least one component on the vehicle;

providing an approval signal to the vehicle;

the at least one command output source transmitting the data to the at least one component according to the approval signal; and enabling the at least one component to operate according to the data, wherein, after generating the request signal, the at least one command output source generates and provides the approval signal to the vehicle only after being confirmed by user operation.

13. The operating method as claimed in claim 1, wherein the at least one first command output source provides the data only after the approval signal is provided to the vehicle.

14. The operating method as claimed in claim 1, wherein, before providing the request signal, the at least one command output source generates the data in advance, and the data is transmitted to the vehicle together with the request signal, or the data and the request signal are respectively transmitted to the vehicle.

15. The operating method as claimed in claim 1, wherein, before providing the request signal, the at least one command output source generates the data in advance, and the data is transmitted to the vehicle together with the approval signal, or the data and the approval signal are respectively transmitted to the vehicle.

16. The operating method as claimed in claim 1, wherein the vehicle includes a vehicle system and a controller area network, and the at least one command output source transmitting the data to the at least one component includes: the first command output source first transmitting the data to the vehicle system, and then the vehicle system transmitting the data to the at least one component through the controller area network.

17. The operation method as claimed in claim 16, wherein the vehicle further includes a detection and authentication system, and the detection and authentication system includes: a position detection system, and a permission setting system and a verification system.

18. The operating method as claimed in claim 17, further comprising the steps of:

using the position detection system to obtain position information of the at least one command output source;

using the permission setting system to set permission of the at least one command output source according to the position information of the at least one command output source; and making operating permission of the at least one component open to allow the at least one command output source to operate the at least one component according to the permission of the at least one command output source.

19. The operating method as claimed in claim 18, wherein the verification system is provided to verify whether the at least one command output source is registered in the vehicle and, when the at least one command output source has been registered in the vehicle, the vehicle allows the at least one command output source to operate the at least one component.

* * * * *